(12) United States Patent
Saito

(10) Patent No.: US 8,331,692 B2
(45) Date of Patent: Dec. 11, 2012

(54) IMAGE PROCESSING SYSTEM AND COMPUTER READABLE MEDIUM

(75) Inventor: Teruka Saito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 994 days.

(21) Appl. No.: 12/359,074

(22) Filed: Jan. 23, 2009

(65) Prior Publication Data

US 2010/0008533 A1    Jan. 14, 2010

(30) Foreign Application Priority Data

Jul. 10, 2008  (JP) ................ 2008-180106

(51) Int. Cl.
G06K 9/64      (2006.01)
G06K 9/00      (2006.01)
(52) U.S. Cl. ........................ 382/217; 382/162
(58) Field of Classification Search .......... 382/162, 382/165, 217
See application file for complete search history.

(56) References Cited

U.S. PATENT DOCUMENTS

| | | | |
|---|---|---|---|
| 5,353,130 A | 10/1994 | Hasegawa | |
| 5,589,949 A | 12/1996 | Miyaza et al. | |
| 5,748,801 A | 5/1998 | Goto | |
| 6,125,213 A | 9/2000 | Morimoto | |
| 6,229,914 B1 | 5/2001 | Hiraishi et al. | |
| 6,470,094 B1 | 10/2002 | Lienhart et al. | |
| 7,805,673 B2 | 9/2010 | Der Quaeler et al. | |
| 8,041,113 B2 | 10/2011 | Nishida | |
| 2003/0007661 A1 | 1/2003 | Noguchi | |
| 2005/0231746 A1 | 10/2005 | Parry et al. | |
| 2006/0126098 A1 | 6/2006 | Shimura et al. | |
| 2008/0012873 A1 | 1/2008 | Nishiwaki | |
| 2008/0079990 A1 | 4/2008 | Iida | |
| 2010/0007912 A1 | 1/2010 | Saito | |

FOREIGN PATENT DOCUMENTS

| | | |
|---|---|---|
| EP | 0528105 A1 | 2/1993 |
| EP | 1499102 A2 | 1/2005 |
| EP | 1670232 A2 | 6/2006 |
| JP | 5-274464 A | 10/1993 |
| JP | 05-292312 A | 11/1993 |

(Continued)

OTHER PUBLICATIONS

Yu, Yi-Wei et al. "Image Segmentation Based on Region Growing and Edge Detection" Systems, Man, and Cybernetics, 1999. IEEE International Conference, Tokyo, Japan. Oct. 12-15, 1999, vol. 6, pp. 798-803. XP010363192.

(Continued)

*Primary Examiner* — Alex Liew
(74) *Attorney, Agent, or Firm* — Sughrue Mion, PLLC

(57) ABSTRACT

An image processing system includes: an image reception unit that receives an image including an additional entry portion; an additional entry portion extracting unit that extracts the additional entry portion from the image received by the image reception unit; a concealment area specifying unit that specifies an area to be concealed in the image based on the additional entry portion extracted by the additional entry portion extracting unit; a concealment reason specifying unit that specifies a concealment reason based on one of operation information related to an operation for the image and a feature of the additional entry portion extracted by the additional entry portion extracting unit; an image concealment unit that conceals the area specified by the concealment area specifying unit in the image; and an image addition unit that adds concealment reason information related to the concealment reason specified by the conceal reason specifying unit to the image.

4 Claims, 9 Drawing Sheets

FOREIGN PATENT DOCUMENTS

| | | |
|---|---|---|
| JP | 06-121146 A | 4/1994 |
| JP | 7-203180 A | 8/1995 |
| JP | 09-062175 A | 3/1997 |
| JP | 10-91768 A | 4/1998 |
| JP | 11-025077 A | 1/1999 |
| JP | 11-120331 A | 4/1999 |
| JP | 2000-231556 A | 8/2000 |
| JP | 2001-325258 A | 11/2001 |
| JP | 2002-259363 A | 9/2002 |
| JP | 2004-118599 A | 4/2004 |
| JP | 2006-135664 A | 5/2006 |
| JP | 2007-110453 A | 4/2007 |
| JP | 2007-166341 A | 6/2007 |
| WO | 2005/022896 A1 | 3/2005 |

OTHER PUBLICATIONS

Extended European Search Report for European Application No. 09001164 dated Nov. 9, 2009.

Australian IP Examiner's first report on patent application No. 2009200948 dated Feb. 18, 2010.

Japanese Office Action issued May 18, 2010 in corresponding Japanese application No. 2008-180106.

Japanese Office Action issued May 18, 2010 in Japanese application No. 2008-180107.

Japanese Office Action issued May 18, 2010 in Japanese application No. 2008-180108.

US Office Action issued in related U.S. Appl. No. 12/402,130 on Jul. 12, 2011.

European Search Report dated Jul. 27, 2009.

Saito, T., U.S. Appl. No. 12/402,073, filed Mar. 11, 2009.

Saito, T., U.S. Appl. No. 12/402,130, filed Mar. 11, 2009.

Non-Final Office Action, issued by the U.S. Patent and Trademark Office in related U.S. Appl. No. 12/402,073 on Dec. 28, 2011.

Final Office Action, issued by the U.S. Patent and Trademark Office in related U.S. Appl. No. 12/402,073 on Apr. 19, 2012.

FIG. 7A
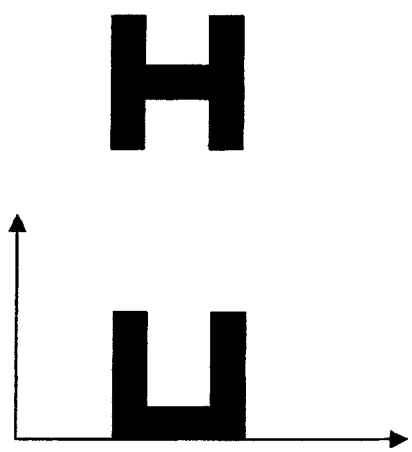
FIG. 7B
FIG. 8A
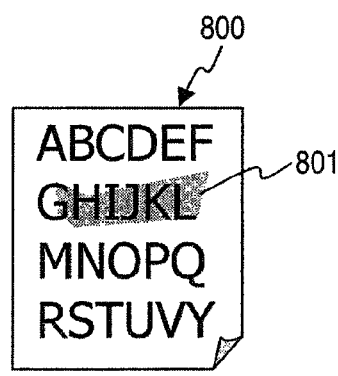
FIG. 8B
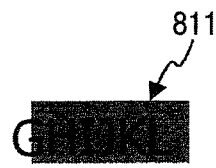
FIG. 8C
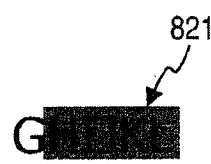

IMAGE PROCESSING SYSTEM AND COMPUTER READABLE MEDIUM

CROSS-REFERENCE TO RELATED APPLICATIONS

This application is based on and claims priority under 35 U.S.C. 119 from Japanese Patent Application No. 2008-180106 filed Jul. 10, 2008.

BACKGROUND

1. Technical Field

The present invention relates to an image processing system and a computer readable medium.

2. Related Art

Documents possessed by administrative organization have been disclosed. However, their documents can include information to be concealed from a viewpoint of Act for the Protection of Computer Processed Personal Data Held by Administrative Organizations. Therefore, when these documents are disclosed, portions in which information to be concealed are described are subjected to black-coloring (so-called sanitizing).

SUMMARY

According to an aspect of the present invention, an image processing system includes: an image reception unit that receives an image including an additional entry portion; an additional entry portion extracting unit that extracts the additional entry portion from the image received by the image reception unit; a concealment area specifying unit that specifies an area to be concealed in the image based on the additional entry portion extracted by the additional entry portion extracting unit; a concealment reason specifying unit that specifies a concealment reason based on one of operation information related to an operation for the image and a feature of the additional entry portion extracted by the additional entry portion extracting unit; an image concealment unit that conceals the area specified by the concealment area specifying unit in the image; and an image addition unit that adds concealment reason information related to the concealment reason specified by the conceal reason specifying unit to the image.

BRIEF DESCRIPTION OF THE DRAWINGS

Exemplary embodiment of the present invention will be described in detail based on the following figures, wherein:

FIGS. 7A and 7B are explanatory views showing an example of the line segment amount;

FIGS. 8A to 8C are explanatory views showing an example of an image to be processed by a mask area specifying module;

DETAILED DESCRIPTION

Referring to drawings, one preferred embodiment for carrying out the invention will be described.

Figure 1:
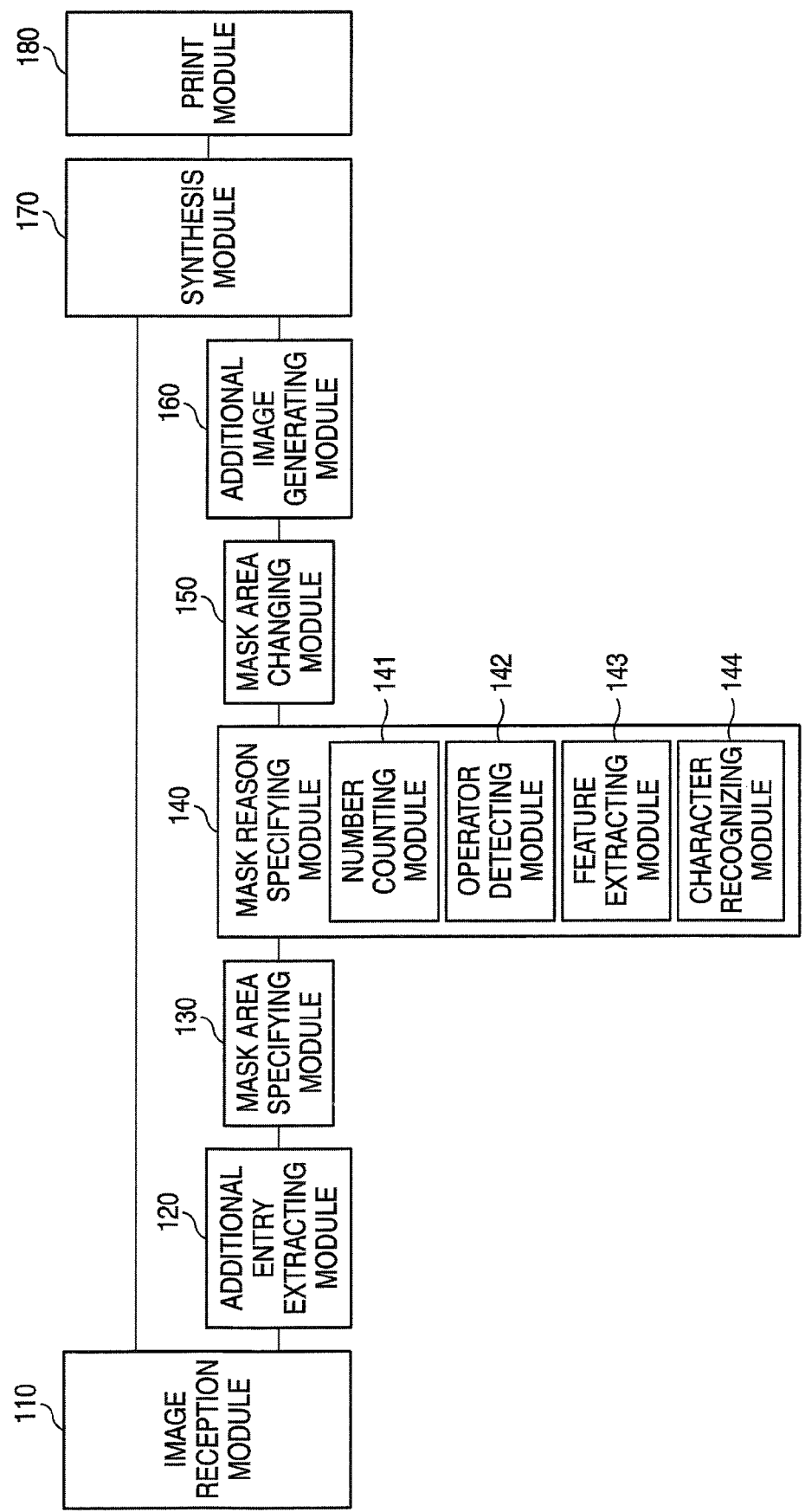
FIG. 1 is a diagram showing a conceptual module configuration in a configuration example in an embodiment of the invention.

FIG. 1 is a diagram showing a conceptual module configuration of a configuration example in this embodiment.

Modules used herein generally refer to parts such as software (computer program) which is logically separable, hardware, and the like. Accordingly, the module in this embodiment includes not only module in the computer program but also the module in hardware configuration. Therefore, this embodiment servers also as explanation of a computer program, a system and a method. However, for convenience of explanation, "store" and words equivalent to this word which are used in the embodiment mean, in case that the embodiment relates to the computer program, to store in a storage unit or to control so as to store in a storage unit. Further, the modules have a one-to-one correspondence relation with their functions. However, in packaging, one module may be configured by one program, plural modules may be configured by one program, and conversely one module may be configured by plural programs. Further, plural modules may be executed by one computer, or one module may be executed by plural computers in distributed environment or in parallel environment. Further, other modules may be included in one module. Further, logical connection besides physical connection is hereafter included in "connection" (data exchange, instruction, and reference relation between data).

Further, a system or an apparatus may be configured by connecting plural computers, hardware, and units through a network (including one-to-one communication connection) or may be realized by one computer, hardware, or unit. The "apparatus" and the "system" are used as an equivalent term to each other. "Preset" refers "before objective processing", and is used including a meaning of "set, even before processing in the embodiment or even after starting processing in the embodiment, according to circumstances/conditions at that time or according to circumstances/conditions till that time".

In the embodiment, as shown in FIG. 1, there are an image reception module 110, an additional entry extracting module 120, a mask area specifying module 130, a mask reason specifying module 140, a mask area changing module 150, an additional image generating module 160, a synthesis module 170, and a print module 180.

The image reception module 110 is connected to the additional entry extracting module 120 and the synthesis module 170, which receives an objective image and delivers its image (hereinafter referred to as an original image) to the additional entry extracting module 120 and the synthesis module 170. The image reception includes image-reading by a scanner, image reception by a facsimile device, image-reading from an image data base, and the like. The objective image is a document to be disclosed, in which entry is added to a portion to be concealed. The image may be one sheet or plural sheets. The additional entry is made, for example, with a pen having semi-transparent color ink other than black ink, and even in case that color is given onto the black-colored characters with this pen, the black-colored characters are clearly recognized. This pen is referred to as a marker pen, a highlight pen or the like. The portion entry-added with this marker pen or the like is particularly referred to as a marker image. Further, the additional entry may be performed with a red-colored ballpoint pen.

The additional entry extracting module 120 is connected to the image reception module 110 and the mask area specifying module 130, which receives the original image from the image reception module 110, extracts an additional entry portion from its original image, and delivers the additional entry portion to the mask area specifying module 130. The extraction is performed, for example, by extracting the area of the entry-added color, or by comparing the received original image with the image having no additional entry (for example, by EOR logical operation).

Further, the additional entry extraction module 120 may extract the additional entry portion from the image received by the image reception module 110 by means of a first threshold, and, by next calculating a second threshold on the basis of a feature in an area located alongside of the portion extracted by means of the first threshold, may extract the additional entry portion from the image received by the image reception module 110 by means of the second threshold. Further, in order to cope with the case where the additional entry (particularly, the marker image) becomes broken by black pixels (for example, line segments) in the image, pixel density or line segment amount in the area may be used, as the feature in the area, in the calculation of the threshold. Further, the "area located alongside of the portion extracted by means of the first threshold" refers to an area around the area extracted by means of the first threshold. More specifically, its area refers to an area adjacent to the area extracted by means of the first threshold in a direction of a character line (in a direction of a long side of a circumscribed rectangle of the extracted character line), that is, areas located in front and back directions of the additional entry direction (drawing direction of a line) of the area extracted by means of the first threshold. The concrete example will be described later with reference to FIG. 4.

Further, the line segment amount used when the second threshold is calculated may be taken as the amount of line segments along the shorter side when the length of the longitudinal side of the additional entry portion extracted by means of the first threshold is compared with the length of the lateral side thereof. Namely, the line segment amount refers to the number of line segments parallel (including an inclination at about 30 degrees) to the shorter side of the longitudinal side and the lateral side of the circumscribed rectangle of the additional entry portion extracted by means of the first threshold (namely, line segments vertical (including an inclination at about 30 degrees) to the longer side. The concrete example will be described later with reference to FIG. 7.

Further, the second threshold is a value capable of extracting an area that is larger than the additional entry portion extracted by means of the first threshold. The extraction of the additional entry portion by means of the second threshold may be performed for the area located alongside of the additional entry portion extracted by means of the first threshold. Namely, since the additional entry portion extracted by means of the first threshold has possibility of a break, the extraction by means of the second threshold is performed in order to extract the additional entry portion in which the portion extracted by means of the first threshold is extended, and performed for only the portion having the above possibility in order to reduce processing areas.

The mask area specifying module 130 is connected to the additional entry extracting module 120 and the mask reason specifying module 140, which specifies an area concealed in the image (hereinafter referred to as a concealed area or a mask area) on the basis of the additional entry portion extracted by the additional entry extracting module 120. Since there are many cases that the additional entry portion is hand-writing, the additional entry portion is hardly rectangular, and the portion that an operator desires to conceal can overflow the additional entry portion. Accordingly, in case of concealment faithful to the additional entry portion, there is the case where the concealment is impossible. The mask area specifying module 130, in order to cope with these problems, extracts a circumscribed rectangle of a character image composed of black pixels in the additional entry portion, and makes the area in which the circumscribed rectangles are united as a mask area.

The mask reason specifying module 140 is connected to the mask area specifying module 130 and the mask area changing module 150, which receives the concealment area and the additional entry portion from the mask area specifying module 130 and specifies a concealment reason on the basis of information concerning the operation for the image or the feature concerning the additional entry portion extracted by the additional entry extracting module 120. Thereafter, the mask reason specifying module 140 delivers the concealment reason and the concealment area to the mask area changing module 150. The mask reason specifying module 140 includes a number count module 141, an operator detecting module 142, a feature extracting module 143, and a character recognizing module 144. Using any one of results of detection by these modules or combined results, the mask reason specifying module 140 specifies a concealment reason.

As concealment (non-disclosure) reasons, there are, for example, the following reasons.

(1) Information capable of identifying specified individual (personal information)
(2) Information detrimental to justifiable profit of corporation (corporative information)
(3) Information detrimental to national safety and relation of trust with foreign countries (national safety information)
(4) Information interfering with public safety and maintenance of public order (public safety information)
(5) Information relating to deliberation and investigation, which is unfairly detrimental to neutrality for decision-making and unfairly causes public confusion (deliberation and investigation information)
(6) Information interfering with suitable execution of work and projects by administrative organ or independent administrative agency (work and project information)

Further, as information concerning the concealment reason, there are a concealment reason and a concealing person (including a person who performed additional entry, a person in charge who gave instructions on the concealment, division name, and the like)

The number count module 141 and the operator detecting module 142 may use, as information concerning the operation for an image, information according to the operation by an operator or information that specifies an operator. More specifically, as the information according to operator's operation, there are to specify a reason by the operator when the embodiment is used, and to prepare plural sets of documents in which additional entry is made for each reason and associate each using number of the embodiment with the reason (for example, first use: reason 1). As the information specifying the operator, when the embodiment is used, an ID (Identification data) card of the operator may be read to extract the operator ID. Further, from a correspondence table between operator ID and responsible person ID, which are previously set, the responsible person ID may be extracted.

The feature extracting module 143 extracts, as a feature concerning the additional entry portion, color information of the additional entry portion. Further, otherwise, modes of the additional entry portion (line width, line type, size, and the like) may be extracted. The character recognizing module 144 recognizes a character image in the concealment area specified by the mask area specifying module 130.

Figure 16A:
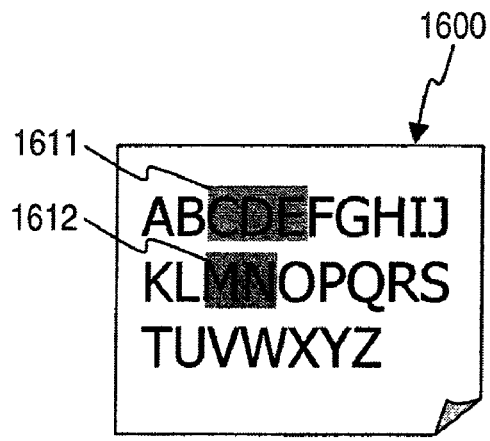
FIGS. 16A and 16B are explanatory views showing an example of an image to be processed by the mask area changing module.
Figure 16B:
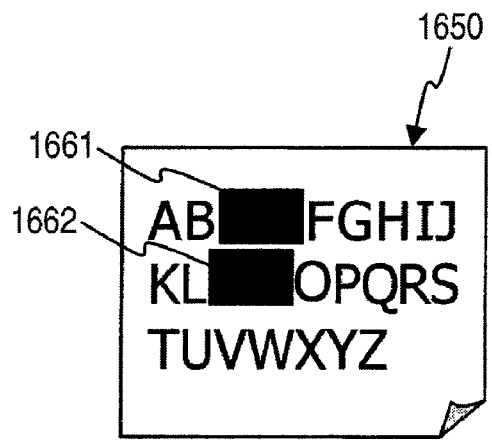

The mask area changing module 150 is connected to the mask reason specifying module 140 and the additional image generating module 160, which receives the concealment reason and the concealment area from the mask reason specifying module 140, and changes the area specified by the mask area specifying module 130. Thereafter, the mask area changing module 150 delivers the concealment reason and the changed area to the additional image generating module 160. Further, the mask area changing module 150, on the basis of sizes of the plural concealment areas specified by the mask area specifying module 130, may change the size of each concealment area. For example, an average value of sizes of the plural concealment areas is calculated, whereby the sizes of the plural concealment areas may be made the size of the average value. The change of concealment area size will be described later with reference to FIG. 16.

The additional image generating module 160 is connected to the mask area changing module 150 and the synthesis module 170, which receives the concealment reason and the concealment area from the mask area changing module 150, and generates an image indicating concealment reasons (referred to also as a concealment reason image or an additional image), using the information concerning the reasons specified by the mask reason specifying module 140. Thereafter, the additional image generating module 160 delivers the concealment area and the concealment reason image to the synthesis module 170. In the concealment reason image, an image indicating information capable of specifying a person which performed the concealment may be also included. Further, the additional image generating module 160 may make the display different according to the size of each concealment area. For example, in case that the size of the concealment area is so large that the concealment reason can be described, the concealment reason may be displayed directly in its concealment area; and in cases other than the above case, the concealment reason is replaced with a symbol, and meaning of its symbol may be displayed on another paper. The determination of the display method is performed by calculating the size of a display area on the basis of the number of characters of the concealment reason and the sizes of their characters, and comparing its display area with the size of the concealment area. Further, according to the concealment reasons, the modes (color, shape, and the like) of the concealment area may be made different, for example, so that in case of the reason 1, the concealment area is displayed in red color, and in case of the reason 2, the shape of the concealment area is circular. The concrete concealment reason image will be described later with reference to FIG. 10.

The synthesis module 170 is connected to the image reception module 110, the additional image generating module 160, and the print module 180, which conceals the area specified by the mask area specifying module 130 in the original image received by the image reception module 110, and adds an image indicating the concealment reason generated by the additional image generating module 160 to the original image.

The synthesis module 170, according to the size of a blank area in the original image, may add the image indicating the information concerning the concealment reason. Namely, in case that the original image has a blank area having such the size that the conceal reason can be displayed, the concealment reason is displayed in its blank area; and in case that the original image has no blank area having such the size that the conceal reason can be displayed, another paper in which the reason is displayed is added to the image sheet and the number of the image sheets (page number) is increased. For example, the size in which each concealment reason can be displayed is calculated in advance; and in case that its size or the total of the sizes in case that there are plural conceal reasons to be displayed is larger than the size of the blank area in the image, an image is generated on another paper. The size used herein may refer to not only the area but also to longitudinal and lateral lengths necessary for display.

Further, the synthesis module 170, in case that the concealment area is changed by the mask area changing module 150, changes also the original images according to the size of the changed concealment area. Namely, the module 170 changes other areas than the concealment area. Further, the module 170 changes other areas than the area specified by the mask area specifying module 130 so as to keep the length of the character line in the original image. The change of the original image will be described later with reference to FIG. 16.

The print module 180 is connected to the synthesis module 170, which outputs the image synthesized by the synthesis module 170 (in which the concealment is performed and the concealment reason image is added) (for example, prints the synthesized image by means of a printer). This printed image becomes an object of disclosure. Further, the disclosure depends on not only printing but also output to a display, transmission through a communication line to another facsimile, storage in an image DB, and the like.

The embodiment may not include the mask reason specifying module 140, the mask area changing module 150, and the additional image generating module 160. In this case, the mask area specifying module 130 and the synthesis module 170 are connected to each other. Further, the embodiment may not include the mask reason specifying module 140 and the additional image generating module 160. In this case, the mask area specifying module 130 and the mask area changing module 150 are connected to each other, and the mask area changing module 150 and the synthesis module 170 are connected to each other. Further, the embodiment may not include the mask area changing module 150. In this case, the mask reason specifying module 140 and the additional image generating module 160 are connected to each other.

Figure 2:
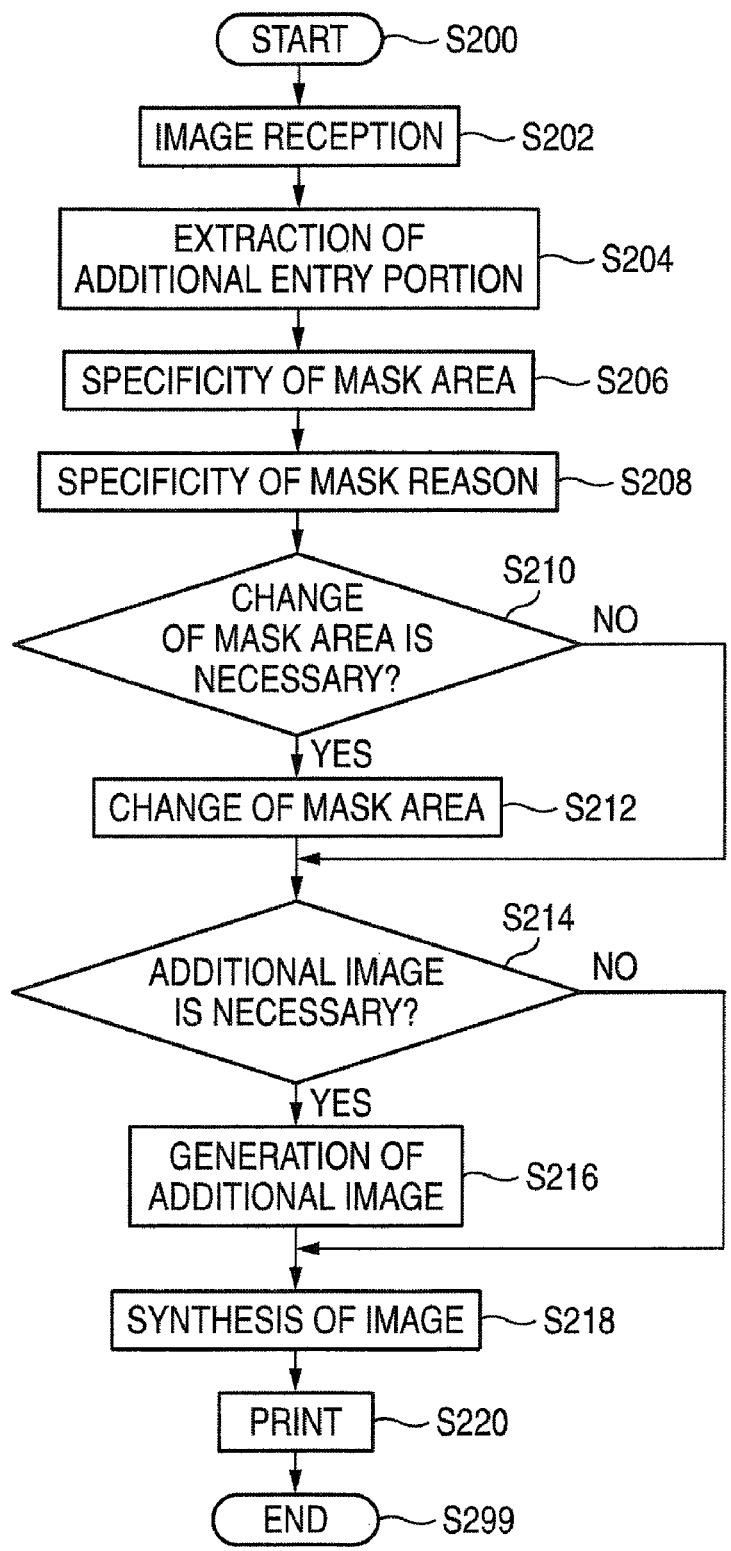
FIG. 2 is a flowchart showing a processing example in the embodiment.

FIG. 2 is a flowchart showing a processing example in the embodiment.

In a step S202, the image reception module 110 receives an entry-added image.

In a step S204, the additional entry extracting module 120 extracts an additional entry portion from an original image. A more detailed processing example will be described later with reference to FIGS. 3 and 6.

In a step S206, the mask area specifying module 130 specifies an area to be masked in the additional entry portion extracted in the step S204.

In a step S208, the mask reason specifying module 140 specifies a masking reason.

In a step 201, the mask area changing module 150 decides whether the change of the mask area is necessary or not. In case that the module 150 decides that the change is necessary, the processing proceeds to a step S212; and in case that the module 150 decides that the change is unnecessary, the processing proceeds to a step S214. Herein, for example, in case that the mask areas have the same size (in case that the sizes of the mask areas are within a range of a preset value, it may be decided that the mask areas have the same size), it may be decided that the change of the mask areas is unnecessary. The mask areas to be decided in this case may be limited to only the mask areas included in the same line.

In the step S212, the mask area changing module 150 changes the mask area.

In the step S214, the additional image generating module 160 decides whether the generation of an additional image is necessary or not. In case that the module 160 decides that the generation is necessary, the processing proceeds to a step S216; and in case that the module 160 decides that the generation is unnecessary, the processing proceeds to a step S218. The decision herein may be performed on the basis of an instruction from the operator.

In the step 216, the additional image generating module 160 generates an additional image.

In the step S218, the synthesis module 170 synthesizes the original image received in the step S202 and the mask area specified in the step S206 (or the mask area changed in the step S212) or the additional image generated in the step S216.

In a step S220, the print module 180 prints the image synthesized in the step S218.

Figure 3:
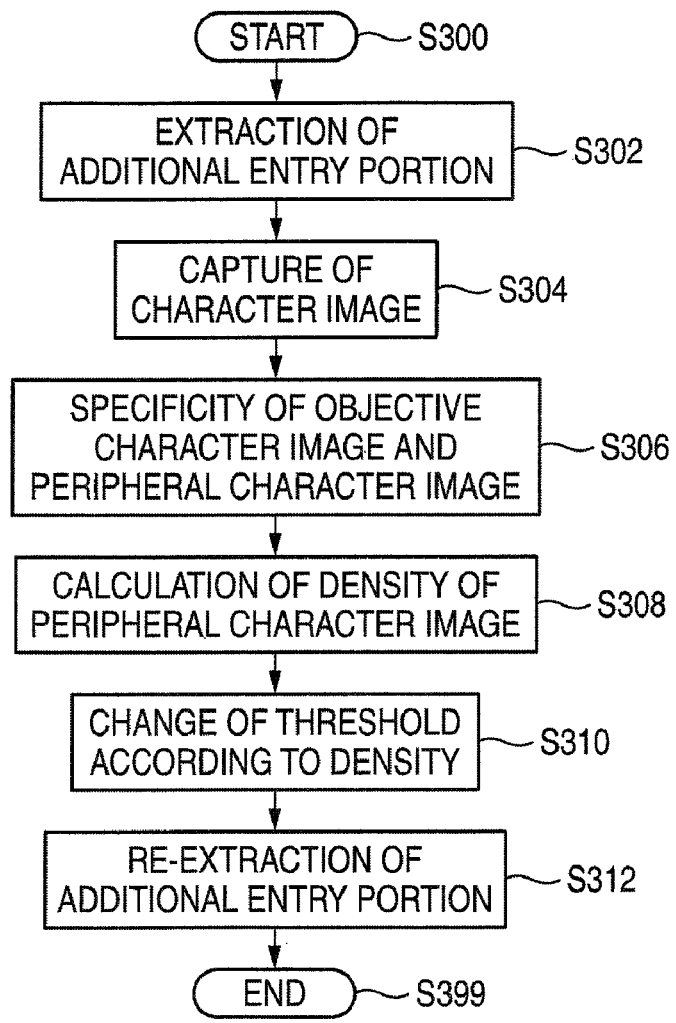
FIG. 3 is a flowchart showing a first processing example by an additional entry extracting module.
Figure 6:
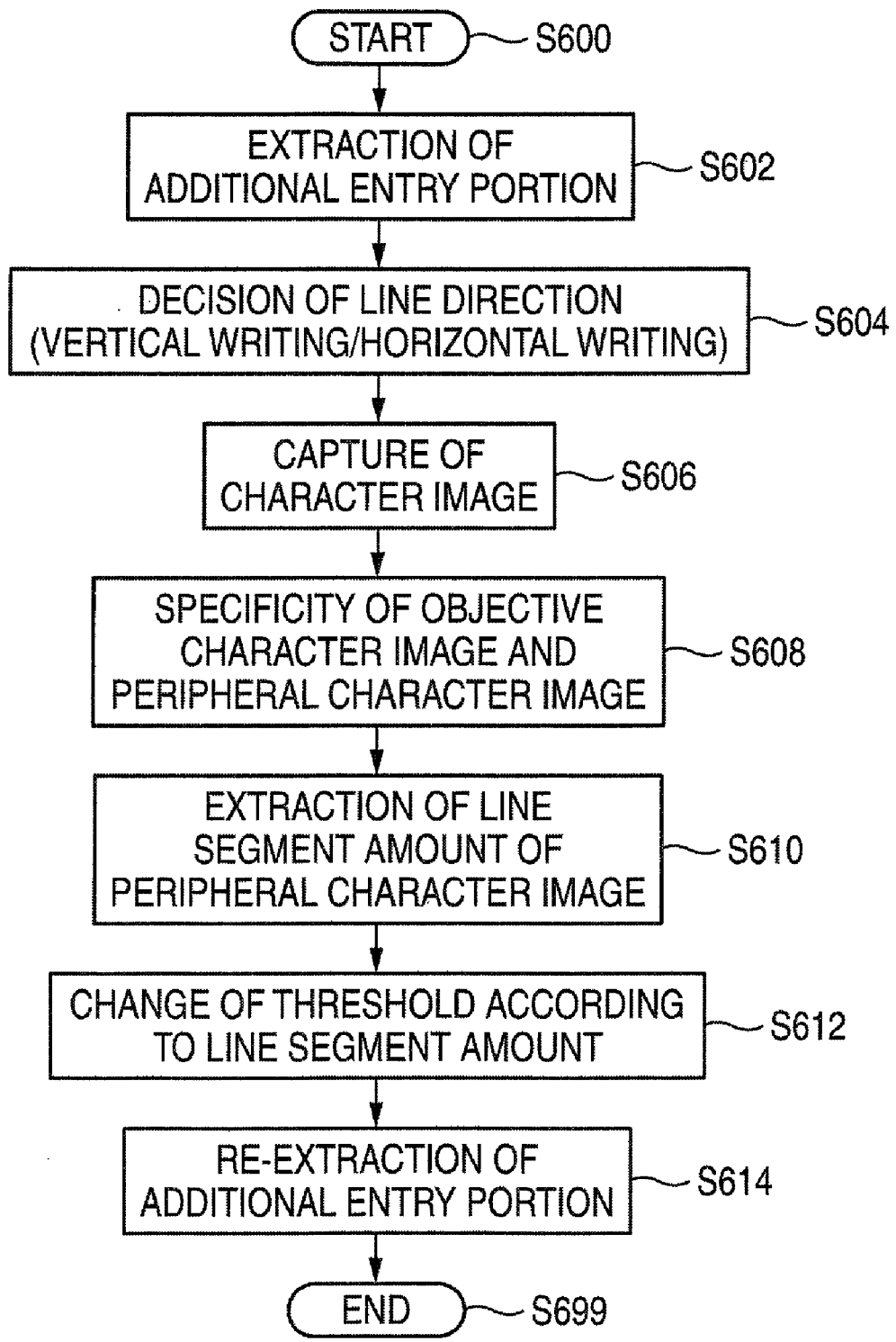
FIG. 6 is a flowchart showing a second processing example by the additional entry extracting module.

FIG. 3 is a flowchart showing a first processing example by the additional entry extracting module 120. In case that an image of a document that is an object is obtained by reading its image by means of a scanner, it can become difficult to extract an additional entry portion and particularly a marker image due to setting of its scanner and influences of image compression. Namely, in order to restrain the concealment intended by a person who made the additional entry from not being performed, the processing example by the flowchart shown in FIG. 3 or 6 is performed.

In a step S302, using a preset first threshold, an additional entry portion is extracted. For example, in L*a*b* space, an area in which color saturation is equal to or greater than the first threshold is extracted. In an example shown in FIG. 4, an area of portions hatched in [F], [#], [G] and [H] is an additional entry portion.

In a step S304, a pixel lump (referred to also as a character image) in an image is captured. The pixel lump includes at least a pixel area in which four pixels or eight pixels are continuously coupled, and includes also a group of these pixel areas. The group of these pixel areas refers to plural pixel areas each of which has four pixels and the like continuously coupled and which are located close to one another. Here, as the pixel areas located close to one another, there are, for example, pixel areas that are close in distance, and image areas captured at blank locations or at an interval by performing projection in a longitudinal or lateral direction so as to capture characters one by one from one line of a sentence.

In many cases, one pixel lump becomes an image of one character. However, the pixel lump does need to be pixel areas which a person can actually recognize as a character. As long as the pixel lump is any pixel lump, it may be a part of a character or pixel areas not forming a character.

Figure 4:
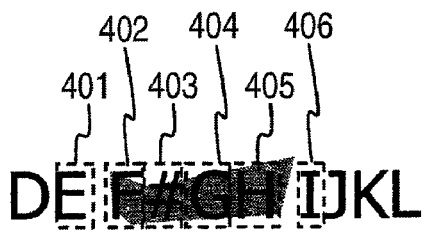
FIG. 4 is an explanatory view showing an example of an image to be processed by the additional entry extracting module.

In the example shown in FIG. 4, [D], [E], [F], [#], [G], [H] [I], [J], [K], and [L] are captured character images.

In a step S306, a character image that is an object is specified, and further character images around the objective character image are specified. Namely, overlapped portions of the additional entry portion extracted in the step S302 and the character images captured in the step S304 are taken as objective character images. A peripheral character image refers to a character image located within preset distance from the objective character image. Further, a circumscribed rectangle of the additional entry portion is made, and a character image in the longitudinal direction (lateral direction in the example of FIG. 4) of its circumscribed rectangle may be taken as a peripheral character image. In the example of FIG. 4, numerals 402 to 405 are objective character images, and numerals 401 and 406 are peripheral character images.

In a step S308, the density of the peripheral character image (ratio which a black pixel bears to the area of a circumscribed rectangle of its character image) is calculated.

In a step S310, according to the density calculated in the step S308, the first threshold is changed and a second threshold is calculated. More specifically, in case that the density is high, the threshold is decreased (namely, the threshold is changed in a direction where the additional entry portion can be made larger); and in case that the density is low, the second threshold is made so as to become an approximate value to the original threshold.

Figure 5:
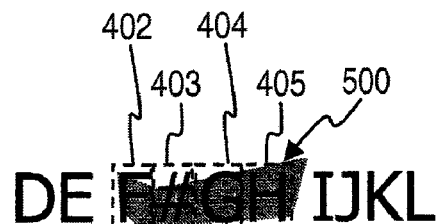
FIG. 5 is an explanatory view showing an example of an image processed by the additional entry extracting module.

In a step S312, using the second threshold calculated in the step S310, the additional entry portion is extracted again from the original image. In this case, processing similar to processing in the step S302 may be performed, or only the peripheral character image portion may be subjected to extraction processing. In an example of FIG. 5, a finally established mask area 500 (including the objective character images 402 to 405) is shown.

FIG. 6 is a flowchart showing a second processing example by the additional entry extracting module 120. In case of processing similar to that in the flowchart example shown in FIG. 3, steps of its processing are shown but their description is omitted. Particularly, when there is such a line segment so to cut the marker image, and white deletion is produced around its line segment due to processing of character emphasis, even if such post-treatment that expansion and contraction are repeated is performed, there are cases that it is difficult to connect the cut images. The second processing is performed in order to cope with this difficulty.

A step S602 is equal to the step S302.

In a step S604, a line direction (vertical writing/horizontal writing) of the original image is decided. For example, projection is performed in relation to the whole of the original image, and a direction in which high projection exists is a direction of the character line. Further, from the horizontal to vertical ratio of the additional entry portion, the line direction may be decided.

A step S606 is equal to the step S304.

A step S608 is equal to the step S306.

In a step S610, line segment amount of the peripheral character image is extracted. The number of line segments in a direction transverse to the line direction decided in the step S604 is extracted. For example, as shown in an example of FIG. 7A, when the peripheral character image is [H], in case that the line direction is horizontal, by making projection in the vertical direction as shown in an example of FIG. 7B, two line segments are extracted. Further, by matching processing with a preset direction pattern, the line segment amount may be extracted.

In a step S612, according to the line segment amount extracted in the step S610, the first threshold is changed and a second threshold is calculated. More specifically, in case that the line segment amount is large, the threshold is decreased (namely, the threshold is changed in a direction where the additional entry portion can be made larger); and in case that the line segment amount is low, the second threshold is made so as to become an approximate value to the original threshold.

A step S614 is equal to the step S312.

FIG. 8 is an explanatory view showing an example of an image to be processed by the mask area specifying module 130.

The mask area specifying module 130 forms the additional entry portion extracted by the additional entry extracting module 120 into a rectangle. In this processing, overflow of the character image from the additional entry portion and shortage thereof in the additional entry portion are solved. For example, as shown in an example of FIG. 8A, an objective image 800 includes an additional entry portion 801. When a circumscribed rectangle of the additional entry portion 801 is extracted, a mask area 811 is obtained as shown in an example of FIG. 8B, in which the overflow in the upper, left, or right direction is produced. Therefore, the mask area specifying module 130 extracts a circumscribed rectangle composed of only character images each of which is included in the mask area 811 at a preset rate (for example, 50%) or more, and specifies a mask area 821 as shown in an example of FIG. 8C.

Here, referring to FIGS. 9 and 10, examples of a document of an object of the embodiment, and of a document to be printed in the embodiment will be described.

Figure 9:
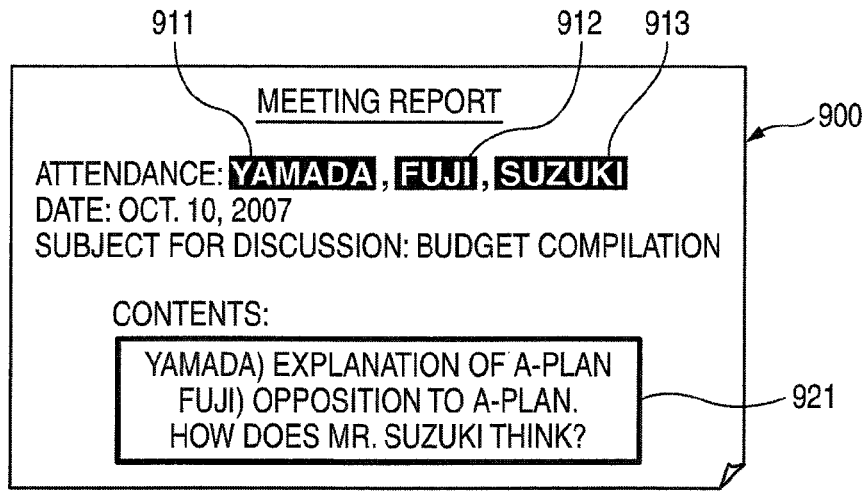
FIG. 9 is an explanatory view showing an example of an image received by an image reception module.

FIG. 9 is an explanatory view showing an example of an image received by the image reception module 110.

An objective image 900 includes an additional entry portion 911, an additional entry portion 912, an additional entry portion 913, and an additional entry portion 921. The additional entry portions 911 to 913 are areas colored with a marker pen of the same color, and the additional entry portion 921 is surrounded by a rectangle written with a marker pen which is different in color from the marker pen used in the additional entry portions 911 and the like. The additional entry portions 911 to 913 are personal information, and the additional entry portion 921 is deliberation/investigation information.

Figure 10A:
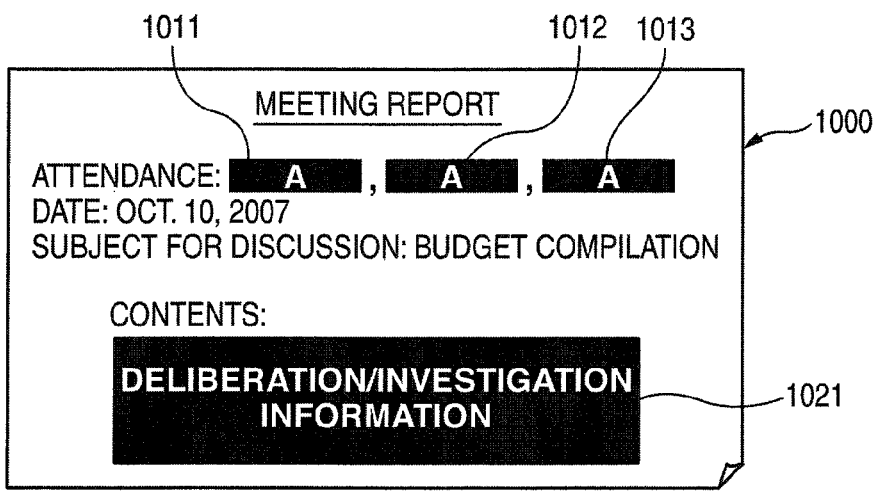
FIGS. 10A and 10B are explanatory views showing an example of an image synthesized by a synthesis module.
Figure 10B:
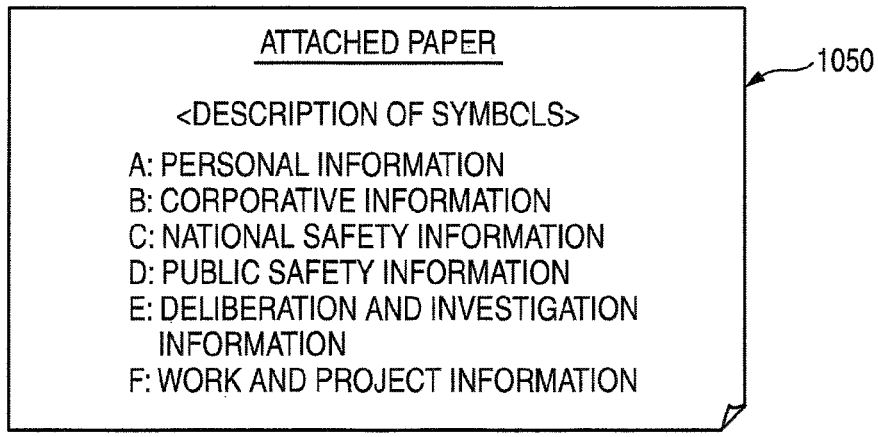

FIG. 10 is an explanatory view showing an example of an image synthesized by the synthesis module 179 (including an additional image generated by the additional image generating module 160).

For the objective image 900, an output image 1000 and an additional output image 1050 are printed. The output image 1000 includes a mask area 1011, a mask area 1012, a mask area 1013, and a mask area 1021. The mask areas 1011 to 1013 are images representing a conceal reason [A], and the mask area 1021 is an image representing a conceal reason [E. deliberation/investigation information]. The additional output image 1050 shows what the reason [A] and the like are. Further, since the mask areas 1011 to 1013 have no size enough to display the conceal reason, only symbols are displayed in the masks areas 1011 to 1013, and the additional output image 1050 displaying meanings of the symbols is added. Further, since the output image 1000 does not have therein such a blank area that the image displayed in the additional output image 1050 can be inserted, the additional output image 1050 is added.

The mask reason specifying module 140 specifies a concealment reason. For example, as shown in FIG. 9, a person who makes additional entry makes the colors used in the additional entry portions different according to the concealment reasons. The mask reason specifying module 140 specifies the conceal reason on the basis of these information.

Figure 11:
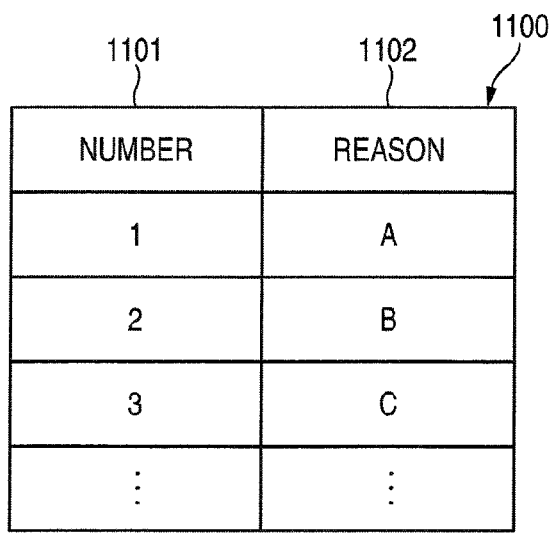
FIG. 11 is an explanatory view showing a data structure example of a number-reason correspondence table.

For example, let it be supposed that such an operation is performed that a document is copied to make plural documents, one document is entry-added with only one concealment reason, and the other copied documents are entry-added with other concealment reasons. Further, let it be supposed that the reason is determined in scanning order. For example, the document entry-added with a reason A is firstly read and the document entry-added with a reason B is secondarily read. In such the case, the number count module 141 detects the number of reading, and specifies the reason by means of a preset number-reason correspondence table 1100. FIG. 11 is an explanatory view showing a data structure example of the number-reason correspondence table 1100. The number-reason correspondence table 1100 includes a number column 1101 and a reason column 1102. Further, when an operator uses the embodiment, he may specify the concealment reason.

Figure 12:
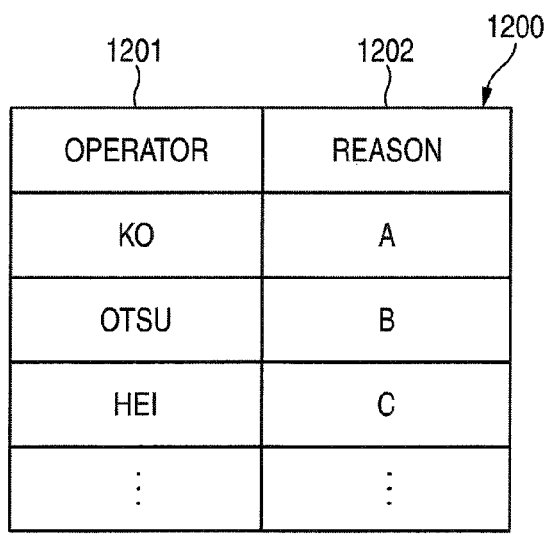
FIG. 12 is an explanatory view showing a data structure example of an operator-reason correspondence table.

As another example, such an operation may be performed that each operator in charge is determined for each concealment reason. For example, Ko-san takes charge of a reason A. In such the case, the operator detecting module 142 detects an operator, and specifies a reason by means of a preset operator-reason correspondence table 1200. FIG. 12 is an explanatory view showing a data structure example of the operator-reason correspondence table 1200. The operator-reason correspondence table 1200 includes an operator column 1201 and a reason column 1202.

Figure 13:
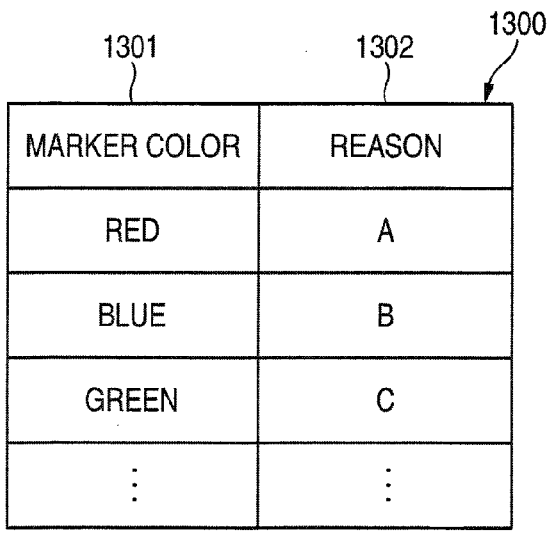
FIG. 13 is an explanatory view showing a data structure example of a marker color-reason correspondence table.

Further, as another example, such an operation may be performed that the marker colors used in the additional entry are associated with the concealment reasons. For example, red color is associated with a reason A. In such the case, the feature extracting module 143 extracts the color of the additional entry portion, and specifies a reason by means of a preset marker color-reason correspondence table 1300. FIG. 13 is an explanatory view showing a data structure example of the marker color-reason correspondence table 1300. The marker color-reason correspondence table 1300 includes a marker color column 1301 and a reason column 1302. Other features than the marker color, such as line width, line type and size of the additional entry may be used. Particularly, in order to increase accessible reasons, it is better to use the marker color in combination with another feature than to use color that is different color but the same color type.

Figure 14:
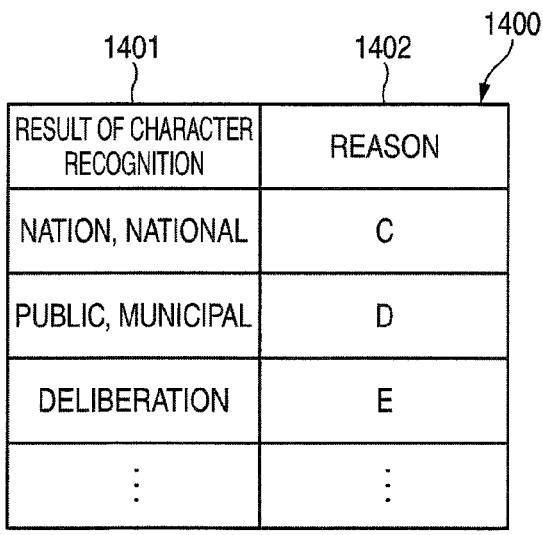
FIG. 14 is an explanatory view showing a data structure example of a character recognition result-reason correspondence table.

Further, as another example, such an operation may be performed that a character in the mask area is recognized thereby to specify the concealment reason. For example, in case that characters of "Nation and the like" are included in the mask area, the concealment reason is C. In such the case, the character recognizing module 144 performs character recognition in the mask area, and specifies a reason by means of a preset character recognition result-reason correspondence table 1400. FIG. 14 is an explanatory view showing a data structure example of the character recognition result-reason correspondence table 1400. The character recognition result-reason correspondence table 1400 includes a character recognition result column 1401 and a reason column 1402.

Figure 15:
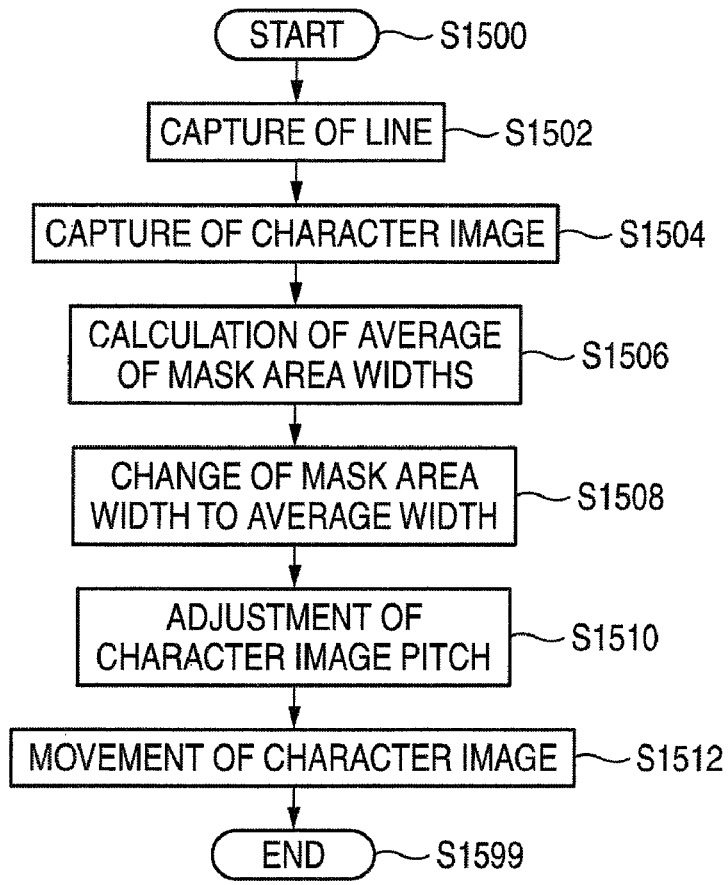
FIG. 15 is a flowchart showing a processing example by a mask area changing module and the synthesis module.

FIG. 15 is a flowchart showing a processing example by the mask area changing module 150 and the synthesis module 170. The concealed character can be presumed by the size of the mask area (particularly, name and the like can be easy to be presumed), and the processing in FIG. 15 copes with this presumption.

In a step S1502, the mask area changing module 150 captures a character line from the original image. The processing similar to the processing in the step S604 shown in the example of FIG. 6 may be performed, or the result of the processing in FIG. 6 may be used. In an example shown of FIG. 16A, character lines of three lines are captured in an objective image 1600.

In a step S1504, the mask area changing module 150 captures character images from the character line having the mask area. The processing similar to the processing in the step S304 shown in the example of FIG. 3 may be performed, or the result of the processing in FIG. 3 may be used. In the example shown in FIG. 16A, character images are captured from the first and second character lines having the mask areas 1611 and 1612. Namely, from the first line, character images [A] to [J], and from the second line, character images [K] to [S] are captured.

In the step S1506, the mask area changing module 150 measures the widths of the respective mask areas, and calculates an average value of the measured width values. In the example shown in FIG. 16A, the module 150 measures the widths of the mask area 1611 (three character width) and the mask area 1612 (two character width), and their measured width values are averaged.

In a step S1508, the mask area changing module 150 changes the width of each mask area to the average value calculated in the step S1506. Namely, the sizes of the plural mask areas become the same. In the example of FIG. 16, the mask area 1611 is changed to a mask area 1661, and the mask area 1612 is changed to a mask area 1662. The mask area 1661 and the mask area 1662 have the same width.

In a step S1510, the synthesis module 170 adjusts a pitch between character images out of the mask area so that the length of the character line in which the mask area width has been changed becomes equal to the length of the character line of the original image. In an example of FIG. 16B, resultantly, the character pitch in the first line is made long, and the character pitch in the second line is made short. Hereby, the lengths of the character lines in an output image 1650 are the same as those in the original image.

In a step S1512, the synthesis module 170, in accordance with the pitch adjusted in the step S1510, moves the character images.

Though the average value of the mask area widths is calculated herein, a minimum value and a maximum value of the mask area width may be used. Further, though the change of the mask area is performed in relation to all the mask areas, it may be performed in each character line.

Figure 17:
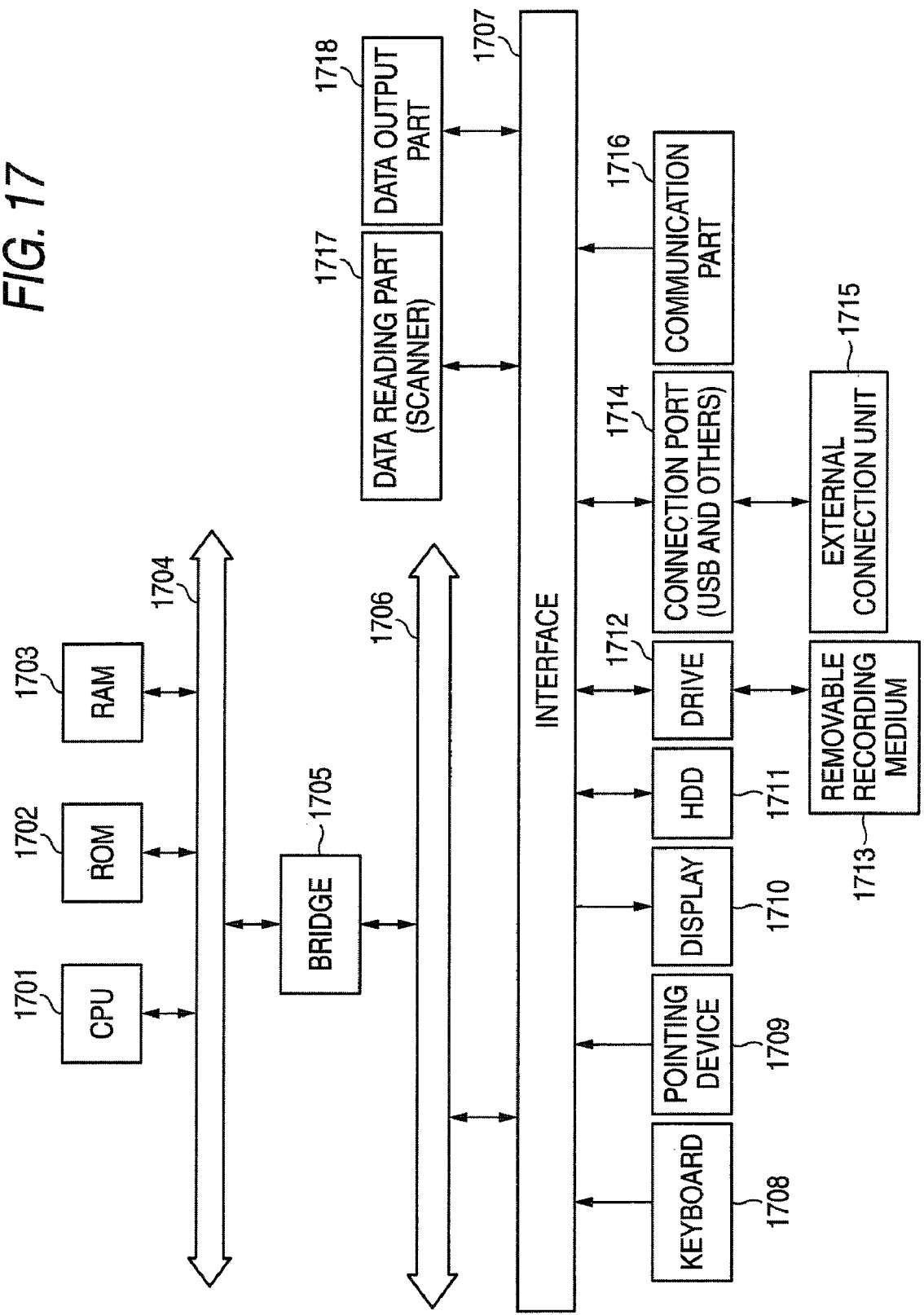
FIG. 17 is a block diagram showing a hardware configuration example of a computer implementing the embodiment.

Referring to FIG. 17, a hardware configuration example in the embodiment will be described. The configuration shown in FIG. 17 is carried out by, for example, a personal computer (PC) and the like, and is a hardware configuration example including a data reading part 1717 such as a scanner and a data output part 1718 such as a printer.

CPU (Central Processing Unit) 1701 is a control part which executes processing in accordance with a computer program in which an execution sequence of each of the various modules described in the afore-mentioned embodiment, that is, the additional entry extracting module 120, the mask area specifying module 130, the mask reason specifying module 140, the mask area changing module 150, the additional image generating module 160, and the synthesis module 170 is written.

ROM (Read Only Memory) 1702 stores a program used by the CPU 1701, an arithmetic parameter, and the like. RAM (Random Access Memory) 1703 stores a program used in execution by the CPU 1701, parameters which change appropriately in its execution, and the like. These parts are interconnected by a host bus 1704 composed of a CPU bus.

The host bus 1704 is connected through a bridge 1705 to an external bus 1706 such as a PCI (Peripheral Component Interconnect/Interface) bus.

A keyboard 1708 and a pointing device 1709 such as a mouse are input devices operated by an operator. A display 1710 is composed of a liquid crystal display unit or CRT (Cathode Ray Tube), and displays various information as a text or image information.

HDD (Hard Disk Drive) 1711 includes a hard disc therein, drives the hard disc, and records or reproduces the program executed by the CPU 1701 and information. In the hard disc, the image received by the image reception module 110 and the image synthesized by the synthesis module 170 are stored. Further, other data processing programs and various computer programs are stored therein.

A drive 1712 reads out data or a program stored in a removable recording medium 1713 such as an attached magnetic disc, optical disc, magneto-optical disc, or semiconductor memory, and supplies its data or program to the RAM 1703 through an interface 1707, the external bus 1706, the bridge 1705, and the host bus 1704. The removable recording medium 1713 is also available as a data recording area similar to the hard disc.

A connection port 1714 is a port for connecting an external connection unit 1715, which has a connection part such as USB, IEEE 1394, or the like. The connection port 1714 is connected to the CPU 1701 and the like through the interface 1707, the external bus 1706, the bridge 1705, and the host bus 1704. A communication 1716 is connected to a network, and executes data communication with the outside. The data reading part 1717 is, for example, a scanner, which executes document reading processing. The data output part 1718 is, for example, a printer, which executes output processing of document data.

The hardware configuration shown in FIG. 17 shows a configuration example, and the embodiment is not limited to the configuration shown in FIG. 17, but any configuration may be used as long as it can execute the modules described in the embodiment. For example, a part of modules may be configured by dedicated hardware (for example, ASIC (Application Specific Integrated Circuit) or the like), apart of modules may be located in an external system and connected to the hardware configuration by a communication line, and further a plurality of systems shown in FIG. 17 may be interconnected by communication lines so as to cooperate with one another. Further, the hardware configuration may be incorporated into a copying machine, a facsimile, a scanner, a printer, a multifunctional machine (image processing system having two or more functions of any of the scanner, the printer, the copying machine, the facsimile, and the like), and the like.

In the embodiment, though the horizontally writing document image is exemplified, the invention may be applied to a vertically writing document. Further, though the character image is exemplified as an object of concealment, the object may be another image (a graphic form or a photograph or the like).

Further, the described program may be provided in storage in a recording medium, and also provided by communication unit. In that case, the before-described program may be apprehended as an invention of a "computer readable recording medium having the program stored therein".

The term "computer readable recording medium having the program stored therein" refers to a recording medium in which the program is recorded and which can be read by a computer and is used for program installation, execution, and distribution.

The recording medium includes, for example, ⌈a DVD-R, a DVD-RW, and a DVD-RAM⌋ to be standards formulated in a DVD forum, which are digital versatile discs (DVDs); ⌈a DVD+R and a DVD+RW⌋ to be standards formulated in DVD+RW; a compact disc (CD) such as a read-only-memory (CD-ROM), a CD recordable (CD-R), and a CD rewritable (CD-RW); a Blue-ray Disk; an magneto-optical disc (MO); a flexible disc (FD); a magnetic tape; a hard disc; a read-only-memory (ROM); an electrically erasable and programmable ROM (EEPROM); a flash memory; a random access memory (RAM); and the like.

The aforesaid program or a part thereof may be recorded in the aforesaid recording medium to be saved and distributed. Further, the program or a part thereof may be transmitted through a transmission medium such as a wire communication network used in a local area network (LAN), a metropolitan area network (MAN), a wide area network (WAN), Internet, an intranet, and Extranet, a wireless communication network, or combination thereof; or may be carried by carriers.

Further, the aforesaid program may be a part of another program, or may be recorded in the recording medium together with another program. Further, the program may be recorded in plural recording mediums in a division manner. Further, the program may be formed in any format, for example, a compressed format or cipher format as long as it is recoverable.

Further, the embodiment can be grasped also as inventions described below, and these inventions may be combined with the mask reason specifying module 140 and the additional image generating module 160.

(B1) An image processing system comprising:
an image reception means which receives an image;
an additional entry portion extracting means which extracts a portion entry-added in the image received by the image reception means;
a concealment area specifying means which specifies an area to be concealed in the image on the basis of the additional entry portion extracted by the additional entry portion extracting means;
an area changing means which changes the area specified by the concealment area specifying means; and
an image concealment means which conceals the area specified by the concealment area specifying means in the image, using the area changed by the area changing means.

(B2) The image processing system according to (B1) characterized in that the area changing means changes, on the basis of the sizes of the plural areas specified by the conceal area specifying means, the sizes of the areas.

(B3) The image processing system according to (B1) or (B2) characterized in that the image concealment means changes other areas than the area specified by the conceal area specifying means.

(B4) The image processing system according to (B3) characterized in that the image concealment means changes other areas than the area specified by the conceal area specifying means so that the length of a character line in the image received by the image reception means is retained.

(B5) An image processing program characterized by causing a computer to function as:

an image reception means which receives an image;
an additional entry portion extracting means which extracts a portion entry-added in the image received by the image reception means;
a concealment area specifying means which specifies an area to be concealed in the image on the basis of the additional entry portion extracted by the additional entry portion extracting means;
an area changing means which changes the area specified by the concealment area specifying means; and
an image concealment means which conceals the area specified by the concealment area specifying means in the image, using the area changed by the area changing means.

(C1) An image processing system comprising:
an image reception means which receives an image;
a first additional entry portion extracting means which extracts a portion entry-added in the image received by the image reception means by means of a first threshold;
a threshold calculating means which calculates a second threshold on the basis of a feature in an area alongside the portion extracted by the first additional entry portion extracting means;
a second additional entry portion extracting means which extracts a portion entry-added in the image received by the image reception means by means of the second threshold calculated by the threshold calculating means;
a concealment area specifying means which specifies an area to be concealed in the image on the basis of the additional entry portion extracted by the second additional entry portion extracting means; and
an image concealment means which conceals the area specified by the concealment area specifying means in the image.

(C2) The image processing system according to (C1) characterized in that the threshold calculating means uses pixel density or line segment amount in the area as the feature in the area.

(C3) The image processing system according to (C2) characterized in that the line segment amount used by the threshold calculating means is the amount of a line segment along a direction of a shorter side when the length of a longitudinal side of the additional entry portion extracted by the first additional entry portion extracting means is compared with the length of a lateral side thereof.

(C4) The image processing system according to any one of (C1) to (C3) characterized in that:
the second threshold calculated by the threshold calculating means is a value capable of extracting a larger area than the additional entry portion extracted by means of the first threshold; and
the second additional entry portion extracting means extracts an additional entry portion, by means of the second threshold, from an area alongside the additional entry portion extracted by the first additional entry extracting means.

(C5) An image processing program characterized by causing a computer to function as:
an image reception means which receive an image;
a first additional entry portion extracting means which extracts a portion entry-added in the image received by the image reception means by means of a first threshold;
a threshold calculating means which calculates a second threshold on the basis of a feature in an area alongside the portion extracted by the first additional entry portion extracting means;
a second additional entry portion extracting means which extracts a portion entry-added in the image received by the image reception means by means of the second threshold calculated by the threshold calculating means;

a concealment area specifying means which specifies an area to be concealed in the image on the basis of the additional entry portion extracted by the second additional entry portion extracting means; and an image concealment means which conceals the area specified by the concealment area specifying means in the image.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing system comprising:
   an image reception unit that receives an image including an additional entry portion;
   a first additional entry portion extracting unit that extracts the additional entry portion from the image, which is received by the image reception unit, by using a first threshold;
   a threshold calculating unit that calculates a second threshold based on a feature in an area alongside the additional entry portion extracted by the first additional entry portion extracting unit;
   a second additional entry portion extracting unit that extracts the additional entry portion from the image, which is received by the image reception unit, by using the second threshold calculated by the threshold calculating unit;
   a concealment area specifying unit that specifies an area to be concealed in the image based on the additional entry portion extracted by the second additional entry portion extracting unit; and
   an image concealment unit that conceals the area specified by the concealment area specifying unit in the image,
   wherein the threshold calculating unit uses one of pixel density and line segment amount in the area as the feature in the area,
   wherein the line segment amount used by the threshold calculating unit is the amount of a line segment along a direction of a shorter side in a case where the length of a longitudinal side of the additional entry portion extracted by the first additional entry portion extracting unit is compared with the length of a lateral side thereof.

2. An image processing system comprising:
   an image reception unit that receives an image including an additional entry portion;
   a first additional entry portion extracting unit that extracts the additional entry portion from the image, which is received by the image reception unit, by using a first threshold;
   a threshold calculating unit that calculates a second threshold based on a feature in an area alongside the additional entry portion extracted by the first additional entry portion extracting unit;
   a second additional entry portion extracting unit that extracts the additional entry portion from the image, which is received by the image reception unit, by using the second threshold calculated by the threshold calculating unit;
   a concealment area specifying unit that specifies an area to be concealed in the image based on the additional entry portion extracted by the second additional entry portion extracting unit; and
   an image concealment unit that conceals the area specified by the concealment area specifying unit in the image,
   wherein the second threshold calculated by the threshold calculating unit is a value capable of extracting a larger area than the additional entry portion extracted by means of the first threshold; and
   the second additional entry portion extracting unit extracts an additional entry portion, by using the second threshold, from an area alongside the additional entry portion extracted by the first additional entry extracting unit.

3. A non-transitory computer readable medium storing a program causing a computer to execute a process for performing image processing, the process comprising:
   receiving an image including an additional entry portion;
   extracting the additional entry portion from the received image by using a first threshold;
   calculating a second threshold based on a feature in an area alongside the extracted additional entry portion;
   extracting the additional entry portion from the received image by using the second threshold;
   specifying an area to be concealed in the image based on the additional entry portion extracted by using the second threshold; and
   concealing the specified area to be concealed in the image,
   wherein the calculating the second threshold comprises using one of pixel density and line segment amount in the area as the feature in the area,
   wherein the line segment amount is the amount of a line segment along a direction of a shorter side in a case where the length of a longitudinal side of the additional entry portion extracted by using the first threshold is compared with the length of a lateral side thereof.

4. A non-transitory computer readable medium storing a program causing a computer to execute a process for performing image processing, the process comprising:
   receiving an image including an additional entry portion;
   extracting the additional entry portion from the received image by using a first threshold;
   calculating a second threshold based on a feature in an area alongside the extracted additional entry portion;
   extracting the additional entry portion from the received image by using the second threshold;
   specifying an area to be concealed in the image based on the additional entry portion extracted by using the second threshold; and
   concealing the specified area to be concealed in the image,
   wherein the second threshold is a value capable of extracting a larger area than the additional entry portion extracted by means of the first threshold, and
   extracting the additional entry portion from the received image by using the second threshold comprises extracting an additional entry portion, by using the second threshold, from an area alongside the additional entry portion extracted by using the first threshold.

* * * * *